(12) United States Patent
Czarnecki et al.

(10) Patent No.: US 10,882,468 B1
(45) Date of Patent: Jan. 5, 2021

(54) WORK VEHICLE COMPOSITE PANORAMIC VISION SYSTEMS

(71) Applicant: Deere & Company, Moline, IL (US)

(72) Inventors: Nathaniel M. Czarnecki, Dubuque, IA (US); John M. Hageman, Dubuque, IA (US); Michael G. Kean, Maquoketa, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/667,356

(22) Filed: Oct. 29, 2019

(51) Int. Cl.
  *B60R 11/04* (2006.01)
  *B60R 21/015* (2006.01)
  *H04N 5/232* (2006.01)

(52) U.S. Cl.
  CPC ........ *B60R 11/04* (2013.01); *B60R 21/01538* (2014.10); *H04N 5/23238* (2013.01); *B60R 2300/105* (2013.01); *B60R 2300/107* (2013.01); *B60R 2300/303* (2013.01)

(58) Field of Classification Search
  None
  See application file for complete search history.

(56) References Cited

U.S. PATENT DOCUMENTS

| 6,593,960 B1 * | 7/2003 | Sugimoto | B60R 11/04 348/142 |
| 7,646,932 B1 * | 1/2010 | Peterson | H04N 5/23238 382/284 |
| 8,633,810 B2 * | 1/2014 | Luo | B60Q 9/008 340/436 |
| 9,071,752 B2 * | 6/2015 | Kuo | G06T 3/0062 |
| 10,391,940 B2 * | 8/2019 | Izumikawa | G06K 9/00791 |
| 2008/0044061 A1 * | 2/2008 | Hongo | B60R 1/00 382/104 |
| 2014/0375814 A1 * | 12/2014 | Ishimoto | E02F 9/24 348/148 |

(Continued)

FOREIGN PATENT DOCUMENTS

CN 103955920 B 7/2014

OTHER PUBLICATIONS https://web.archive.org/web/20190618201719/https://www.ritchiespecs.com/model/caterpillar-950-wheel-loader (Year: 2019).*

(Continued)

*Primary Examiner* — Tyler W. Sullivan
(74) *Attorney, Agent, or Firm* — Klintworth & Rozenblat IP LLP

(57) ABSTRACT

A composite panoramic vision system utilized onboard a work vehicle includes a display device, a vehicle-mounted camera array, and a controller. The vehicle-mounted camera array includes, in turn, first and second vehicle cameras having partially overlapping fields of view and positioned to capture first and second camera feeds, respectively, of the work vehicle's exterior environment from different first vantage points. During operation of the composite panoramic vision system, the controller receives the first and second camera feeds from the first and second cameras, respectively; generates a composite panoramic image of the work vehicle's exterior environment from at least the first and second camera feeds; and then presents the composite panoramic image on the display device for viewing by an operator of the work vehicle.

18 Claims, 6 Drawing Sheets

(56) References Cited

U.S. PATENT DOCUMENTS

| | | | |
|---|---|---|---|
| 2016/0044284 A1* | 2/2016 | Goseberg | G06F 3/012 |
| | | | 348/148 |
| 2016/0137126 A1* | 5/2016 | Fursich | H04N 5/23238 |
| | | | 348/38 |
| 2016/0191795 A1* | 6/2016 | Han | B60R 1/00 |
| | | | 348/36 |
| 2016/0295108 A1* | 10/2016 | Cao | H04N 17/002 |
| 2017/0030054 A1* | 2/2017 | Okumura | H04N 5/23293 |
| 2018/0191954 A1* | 7/2018 | Pan | H04N 13/246 |
| 2019/0126825 A1* | 5/2019 | Park | B60W 30/0956 |
| 2019/0150357 A1* | 5/2019 | Wu | A01C 21/00 |

OTHER PUBLICATIONS

Deere & Company, pending Utility U.S. Appl. No. 16/591,948, filed Oct. 3, 2019 with the USPTO (all pages).

* cited by examiner

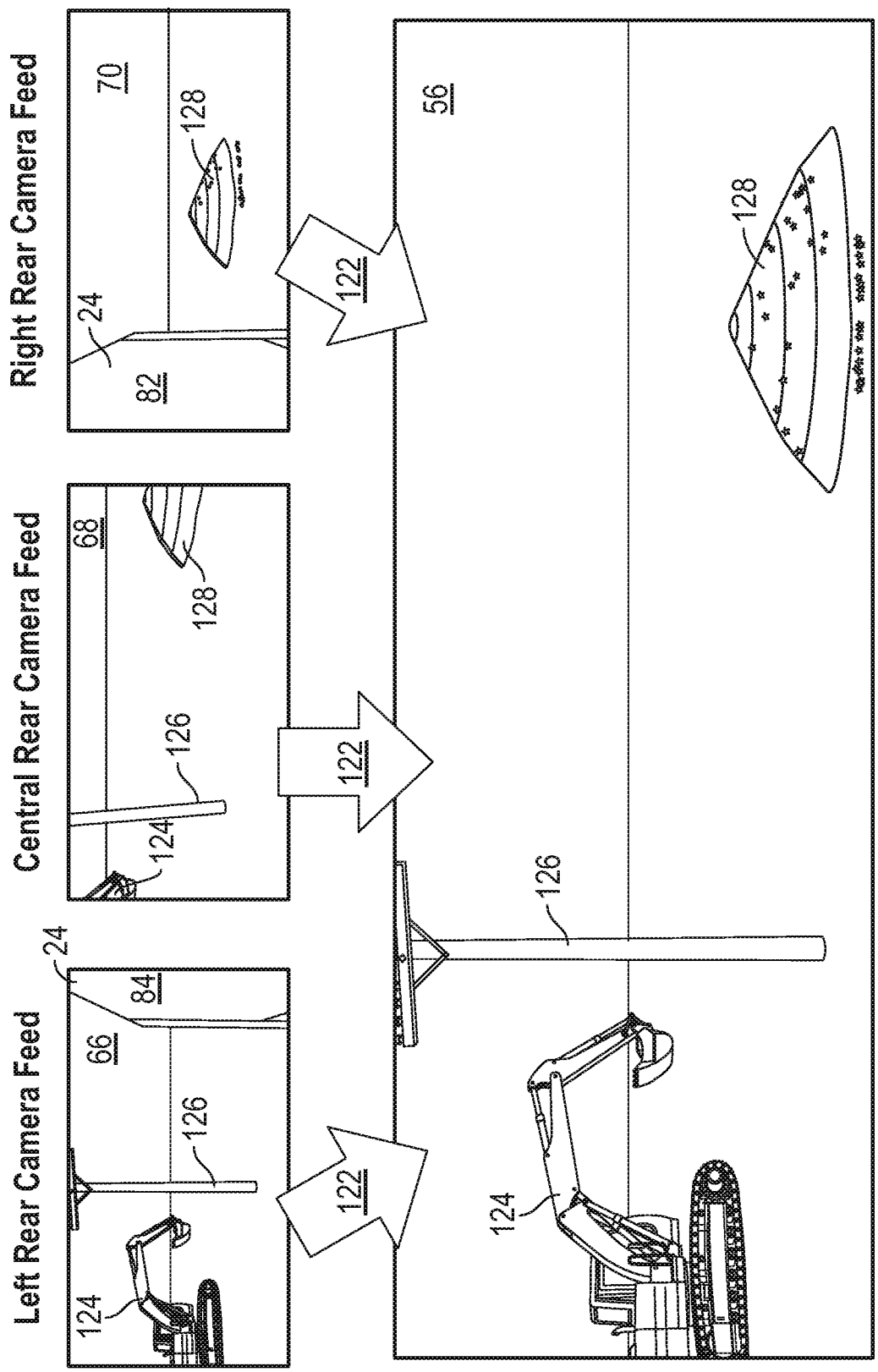

WORK VEHICLE COMPOSITE PANORAMIC VISION SYSTEMS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to embodiments of a work vehicle vision system, which generates composite panoramic imagery of a work vehicle's surrounding environment from multiple camera feeds captured by a vehicle-mounted camera array.

BACKGROUND OF THE DISCLOSURE

Work vehicles utilized within construction, agriculture, forestry, mining, and other industries commonly operate in challenging work environments. Operators are often required to carefully navigate such work vehicles, while performing various tasks and avoiding surrounding structures, neighboring work vehicles, and other obstacles. A given work vehicle may be a sizable and complex machine, requiring a relatively high level of operator skill to control the various functions of the work vehicle, in many instances including the movement of boom-mounted implements or other end effectors. Concurrently, visibility from the operator station or cabin of the work vehicle may be limited by the chassis of the work vehicle, by the positioning of a bucket or other end effector relative to the cabin, and other visual hinderances. For this reason, certain work vehicles are now equipped with camera-based display systems or "vision systems" providing operators with relatively unobstructed views of a work vehicle's exterior environment. As a specific example, a work vehicle may be equipped with a vision system providing an operator with a view of the environment generally to the rear of the work vehicle, as presented on a display screen within the cabin of the work vehicle. This not only improves operator efficiency and situational awareness by providing an unobstructed rear view of the work vehicle's surrounding environment, but may also improve operator comfort by enabling the operator to remain seated in a forwarding-facing position, while viewing the display screen and operating the work vehicle in reverse.

SUMMARY OF THE DISCLOSURE

Work vehicle composite panoramic vision systems are disclosed, which generate composite panoramic imagery from camera feeds captured by a work vehicle-mounted camera array. In embodiments, the work vehicle composite panoramic vision system includes a display device utilized within an operator station of the work vehicle, a vehicle-mounted camera array, and a controller. The vehicle-mounted camera array includes, in turn, a first vehicle camera mounted to the work vehicle, having a first Field of View (FOV), and positioned to capture a first camera feed of the work vehicle's exterior environment from a first vantage point. The camera array also includes second vehicle camera mounted to the work vehicle, having a second FOV partially overlapping with the first FOV, and positioned to capture a second camera feed of the work vehicle's exterior environment from a second vantage point. The controller is operably coupled to the display device, to the first vehicle camera, and to the second vehicle camera. The controller is configured to: (i) receive the first and second camera feeds from the first and second vehicle cameras, respectively; (ii) generate a consolidated panoramic image of the work vehicle's exterior environment from at least the first and second camera feeds; and (iii) present the consolidated panoramic image on the display device for viewing by an operator of the work vehicle.

In further embodiments, the composite panoramic vision system includes a vehicle-mounted camera array containing: (i) a right rear vehicle camera mounted to the work vehicle, having a first FOV, and positioned to capture a right rear vehicle camera feed of the work vehicle's exterior environment; (ii) a central rear vehicle camera mounted to the work vehicle, having a second FOV overlapping with the first FOV, and positioned to capture a central rear vehicle camera feed of the work vehicle's exterior environment; and (iii) a left rear vehicle camera mounted to the work vehicle, having a third FOV overlapping with the second FOV, and positioned to capture a left rear vehicle camera feed of the work vehicle's exterior environment. A controller is operably coupled to the right rear vehicle camera, to the central rear vehicle camera, to the left rear vehicle camera, and to a display device, which is located within the cabin of a work vehicle equipped with the composite panoramic vision system. The controller is configured to generate a consolidated panoramic rear image of the work vehicle's exterior environment utilizing imagery extracted from the right, central, and left rear vehicle camera feeds. During operation of the work vehicle composite panoramic vision system, the controller presents the consolidated panoramic rear image on the display device for viewing by an operator of the work vehicle.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 6 illustrates an example scenario in which three camera feeds captured by different vehicle cameras contained in the highly-distributed camera may be visually combined or consolidated to yield a composite panoramic image, which is then presented on a display device of the composite panoramic vision system.

Figure 1:
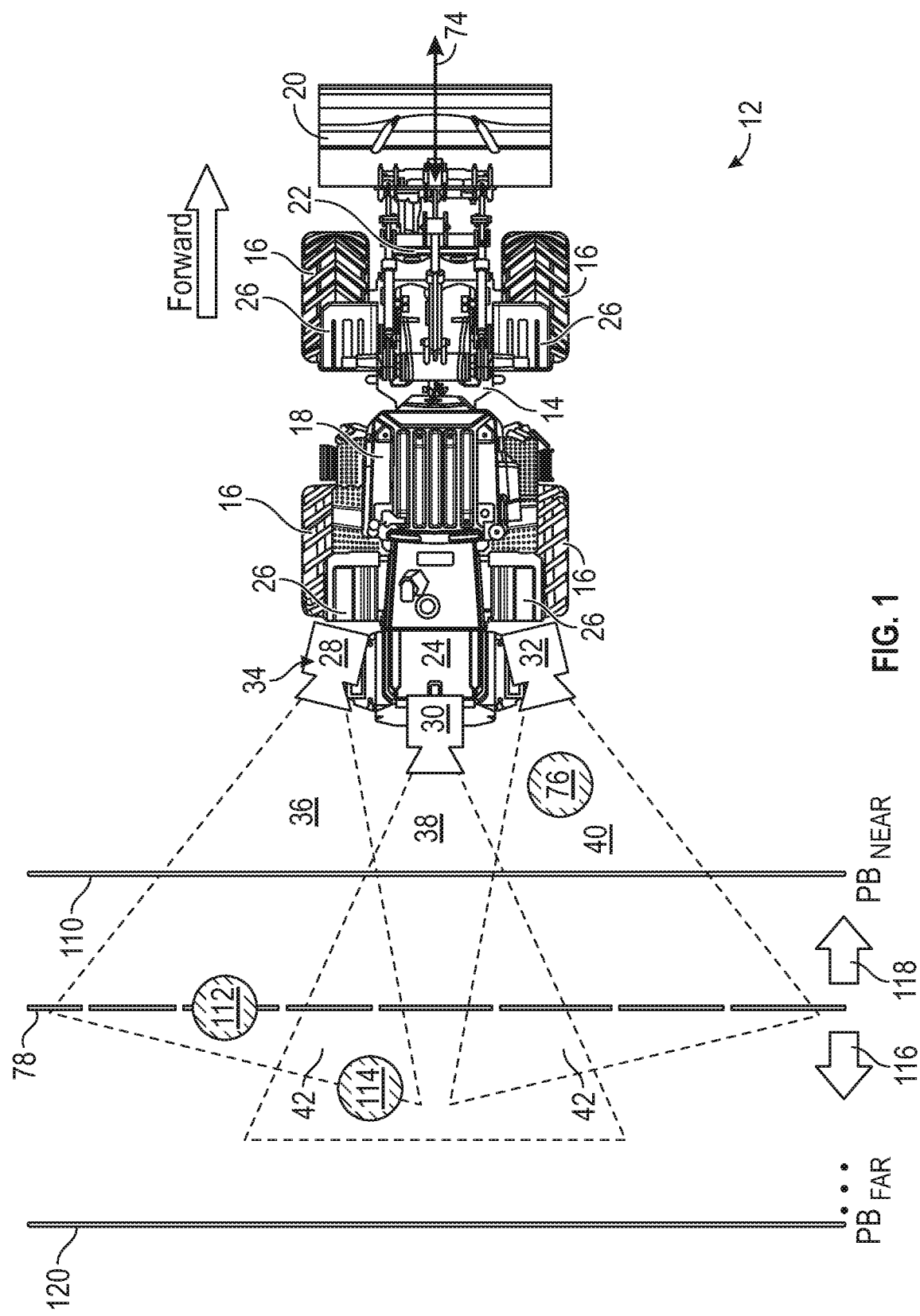
FIG. 1 is a top-down or planform view of a work vehicle (here, a wheeled loader) equipped with an example embodiment of the composite panoramic vision system.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims. As appearing herein, the term "exterior environment" and the term "surrounding environment" are utilized interchangeably to broadly refer to a work environment or area exterior to a work vehicle, whether generally located to the front, to a side, or to the rear of the work vehicle, or any combination thereof. Further, the term "display" refers the composite imagery or "picture" generated on the screen of a display device, while the term "display device" refers to an image-generating device on which a display is presented, such as the below-described composite panoramic display.

Overview

As previously mentioned, certain work vehicles can be equipped with vision systems including multiple cameras enabling an operator to select amongst different camera (live video) feeds of the work vehicle environment for operator viewing on a display device within the cabin of the work vehicle. Such multi-camera vision systems are particularly useful in the context of work vehicles given the relatively large size of many work vehicles, the complexities involved in operating work vehicles capable of performing multiple work functions simultaneously, and the dynamic environments within which work vehicles often operate. The inclusion of multiple cameras within the vision system thus provides an operator with greater flexibility to select a camera feed providing an optimal view of the work vehicle's exterior environment best suited for a particular set of circumstances or for performing a particular work task. For example, in many instances, an operator may interact with the multi-camera vision system to select a camera feed offering a superior view of a region of interest within the work vehicle's surrounding environment, with the selected camera feed potentially lacking visual obstructions or hinderances present in the other camera feeds captured by the vision system.

Conventionally, a work vehicle vision system typically presents a single camera feed (that is, the imagery captured by a single vehicle camera) on a display device at a given juncture in time. Thus, in instances in which the work vehicle vision system contains multiple vehicle cameras, an operator may be required to switch between or scan through the available camera feeds, as presented on the display device, to maintain situational awareness of the content contained in all available camera feeds of the vision system. This not only exacerbates operator workload, but also increases the likelihood that an operator may be unaware of content contained within a particular camera feed when not currently presented on the display device. It is, of course, possible to present multiple camera feeds concurrently on the display device in, for example, a side-by-side, grid, or picture-in-picture format. Such an approach is also disadvantageous, however, in that imagery contained in the camera feeds and presented on the display device may be visually disjointed and redundant, depending upon the respective fields of view (FOVs) of the vehicle cameras. Consequently, concurrent presentation or display of multiple camera feeds in visually distinct windows or regions of the display device can detract from rapid visual comprehension by the operator and fails to optimize usage of the available display area of the display device screen. As a further limitation associated with existing work vehicle vision systems, the FOV of a single vehicle camera can be undesirably limited, particularly considering that work vehicles commonly operate in relatively expansive work environments populated by cross-traffic, various other obstacles (both movable and stationary), and irregular terrain topologies. While it is possible to equip the vehicle cameras with wide angle lenses, such lenses tend to distort the visual images captured by the vehicle cameras and may still provide undesirably limited FOVs. An industry demand thus persists for multi-camera work vehicle vision systems capable of providing operators with relatively expansive views of a work vehicle's surrounding environment, while reducing operator workload when navigating through multiple camera feeds during work vehicle operation.

In satisfaction of this industrial demand, the following discloses work vehicle vision systems capable of generating composite panoramic imagery from multiple camera feeds captured by a vehicle-mounted camera array, such as a highly-distributed camera array of the type described below. In embodiments, the composite panoramic vision system includes multiple cameras strategically mounted at different locations on or about a work vehicle to capture camera (live video) feeds of the work vehicle's exterior environment from various vantage points or viewing angles. The vehicle-mounted cameras (or, more simply, "vehicle cameras") can each capture any desired portion or region of a work vehicle's exterior environment, whether generally located to the front, to a side, or to the rear of the work vehicle. In many embodiments, the vehicle-mounted camera array will include at least one rear vehicle camera; and, in certain implementations, the camera array may include two or more rear cameras providing feeds from which a controller of the vision system generates a panoramic image of the work environment generally to the rear of the work vehicle. As appearing herein, the term "rear vehicle camera" refers to a camera at least partially facing toward the rear of a work vehicle and, therefore, having an FOV capturing an area or region at least partially located behind the work vehicle, regardless of the particular location at which the camera is mounted on the work vehicle. To provide a more specific, albeit non-limiting example, embodiments of the work vehicle composite panoramic vision system may include right, central, and left rear vehicle cameras; the terms "right," "central," and "left" further defined herein in relation to the orientation of an operator when seated in the operator station (e.g., cabin) of the work vehicle in a forward-facing position.

As indicated above, the camera array of the composite panoramic vision system may be referred to as "highly distributed" in certain instances. As utilized herein, the term "highly distributed" denotes that at least two vehicle cameras within the camera array are mounted to a work vehicle at different locations and separated by one or more intervening structural features of the work vehicle, which block a line of sight (LOS) between the vehicle cameras; the term "line of sight" utilized to refer to a hypothetical straight line drawn between a given pair of cameras in three dimensional space and not related to the respective camera FOVs. For example, in the case of a highly-distributed camera array containing at least two rear vehicle cameras, a LOS (and generally all lines of sight) between the vehicle cameras may be blocked by sidewalls of the engine bay housing, the operator cabin, or similar structural features of the work vehicle. Such LOS interference between the cameras may occur in the context of work vehicle-mounted camera arrays given the relatively complex geometry and size of many work vehicles, as well as the desire to provide a relatively broad camera-to-camera spacing to capture the surrounding environment from various vantage points with reduced visual encumbrances of the work vehicle features. In this regard, it may be case that first and second cameras contained in the highly-distributed camera array have a camera-to-camera spacing exceeding 1 meter; and, perhaps, ranging from about 1.5 meters to about 5 meters in embodiments. Further, in certain instances, the camera array may include at least one right rear vehicle camera and at least one left rear vehicle camera, with the right and left rear vehicle cameras located closer to right and left rear wheels of the work vehicle, respectively, than to the longitudinal axis of the work vehicle. Additional description of potential dispositions of the vehicle cameras included in the highly-distributed camera array is set-forth below in connection with FIGS. 3 and 4.

Technical challenges are encountered when generating a composite panoramic image having a relatively expansive FOV from multiple camera feeds captured by cameras arranged in a highly-distributed camera array, while minimizing visual aberrations present within the composite panoramic image. To minimize such visual aberrations and maximize the integrity of the composite panoramic image, different image consolidation or "stitching" processes may be employed by a controller of the work vehicle composite panoramic vision system when generating the composite panoramic image from the vehicle camera feeds. For example, in certain implementations, the vehicle cameras may be stereoscopic cameras capable of gathering camera-specific three dimensional (3D) image data or may otherwise be capable of providing depth measurements for physical objects within the camera FOVs (also considered "camera-specific 3D image data" herein). In such embodiments, the controller may utilize the 3D image data in generating the composite panoramic image for presentation on a display device within the work vehicle cabin. For example, in one approach, the controller may construct a 3D visual map or matrix of the regions in which the camera FOVs overlap or coincide (herein, the "FOV overlap regions") and then utilize the 3D visual map to spatially align the camera feeds based upon the location (pixel coordinates) of distinct visual features within the 3D visual map. The controller then presents a consolidated panoramic display including the consolidated panoramic image, and possibly including other visual elements (e.g., Graphical User Interface (GUI) icons of the type discussed below), on a display device within the cabin of the work vehicle for viewing by the vehicle operator.

Advantageously, such a 3D image consolidation approach tends to generate a high fidelity composite panoramic image lacking visual aberrations with relatively modest calibration requirements. However, such an approach relies upon the ability of the composite panoramic visual system to gather 3D image data of objects located with the FOV overlap regions. Not only is equipping the composite panoramic visual system within multiple stereoscopic cameras (or other camera devices capable of collecting camera-specific depth measurements) relatively costly, but such 3D image consolidation techniques may place undesirably high processing demands on the controller. For at least these reasons, other embodiments of the composite panoramic vision system may utilize a two dimensional (2D) image consolidation technique in constructing the panoramic composite image. For example, in one approach, the controller may align the camera feeds captured by multiple cameras by aligning visual features within the FOV overlap regions, as taken along a virtual 2D plane (referred to herein as a "2D calibration plane") extending orthogonal to the work vehicle's longitudinal axis and spaced from (e.g., located behind) the work vehicle at a location intersecting the FOV overlap regions. Beneficially, such a 2D calibration plane approach reduces the processing demands placed on the controller and eliminates the need for depth augmentation allowing the usage of less costly monoscopic cameras. However, as a tradeoff, visual aberrations can occur within the consolidated panoramic image when a significant spatial disparity develops between the location of objects within the camera FOVs and the location of the 2D calibration plane in three dimensional space. Thus, to reduce such visual aberrations, the 2D calibration plane may be dynamic or movable in embodiments of the composite panoramic vision system. Specifically, in this latter case, the controller of the composite panoramic vision system may repeatedly adjust the distance between the 2D calibration plane and the work vehicle based upon, for example, the location of any obstacles detected to the rear of the work vehicle, as further described below. Regardless of the image consolidation approach employed, other image processing techniques may also be utilized to improve the quality of the composite panoramic image; e.g., the vehicle cameras may also be intrinsically calibrated to remove radial or barrel distortion effects, as needed.

Embodiments of the composite panoramic vision system further enable an operator to ready navigate or switch between viewing the composite panoramic display and alternatively viewing any selected single camera feeds on the display screen of the display device. For example, in embodiments in which the composite panoramic vision system includes left rear, central rear, and right rear vehicle cameras, the composite panoramic vision system may generate the composite panoramic display to include GUI icons capable of being selected by an operator utilizing an operator interface to transition the vision system to presentation of a single camera feed corresponding to the selected GUI icon. For rapid visual comprehension, the icons may be generated as camera icons having a spatial disposition on the display device corresponding to the real-world spatial disposition of the vehicle cameras. For example, in embodiments, a camera icon representing the left rear vehicle camera may be displayed in a left (e.g., corner) region of the composite panoramic display, a camera icon representing the central rear vehicle camera may be displayed in a central (e.g., lower or upper) region of the display, and a camera icon representing the right rear vehicle camera may be displayed in a right (e.g., corner) region of the display. Additionally or alternatively, the controller of the composite panoramic vision system may be configured to automatically transition from presentation of the composite panoramic display to presentation of a single camera feed in response to the occurrence of certain conditions. For example, in at least some implementations of the vision system, the controller may automatically transition (that is, transition without requiring operator input) from presentation of the composite panoramic display to presentation of a single camera feed on the display device when determining that a detected obstacle is located relatively close to the work vehicle; e.g., within a proximal calibration plane boundary limit when a 2D image consolidation technique is applied, as discussed below. In so doing, the controller may further automatically select the single camera feed providing the optimal view of the detected obstacle.

In the above-described manner, the work vehicle composite panoramic display system generates a composite panoramic image of the work vehicle's surrounding environment to enhance operator situational awareness, while reducing operator workload associated with navigating through multiple camera feeds. An example embodiment of the work vehicle composite panoramic vision system will now be discussed in connection with FIGS. 1-6. For the purposes of explanation, the following example focuses on a particular type of work vehicle (a wheeled loader) equipped with three rear vehicle cameras, the live video feeds of which are utilized to generate a consolidated panoramic image presented on an example composite panoramic display (possibly along with other graphical element, such as GUI icons). The following example notwithstanding, it is emphasized that embodiments of the composite panoramic vision system can be utilized in conjunction with various different types of work vehicles; and, further, that the vehicle cameras can capture views of any portions or regions of the environment surrounding or adjacent a work vehicle. Further, description of the manner in which the composite panoramic display and the associated GUI appears in the illustrated example is provided purely by way of non-limiting illustration; noting that the "look and feel" of the GUI and the composite panoramic display will inevitably vary among embodiments and may be customizable to customer or operator preferences.

Example Work Vehicle Composite Panoramic Vision System

Figure 2:
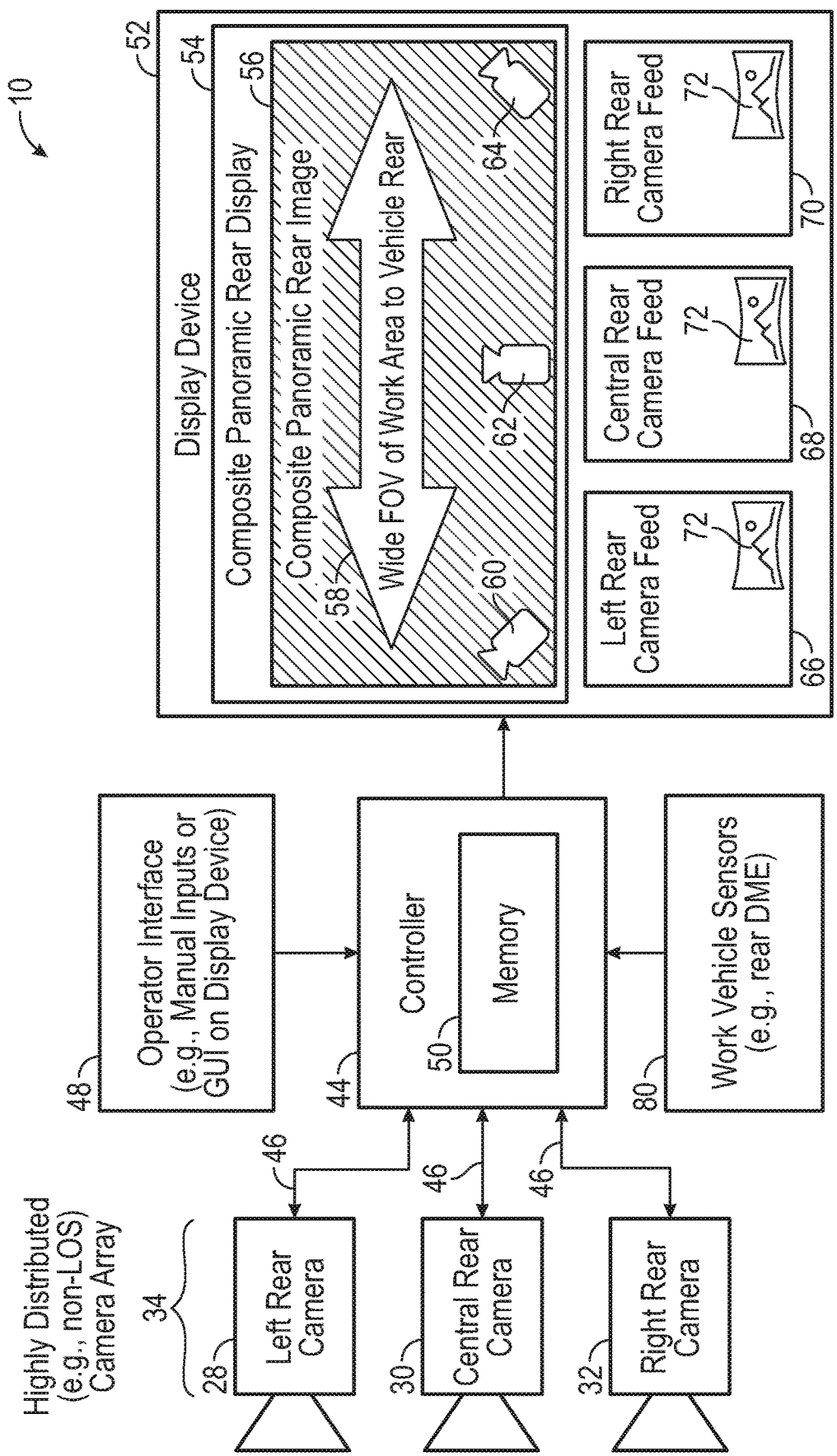
FIG. 2 is a schematic of the example composite panoramic vision system deployed onboard the work vehicle shown in FIG. 1 and including a controller, a display device, and a highly-distributed camera array.

Referring jointly to FIGS. 1 and 2, an example embodiment of a work vehicle composite panoramic vision system 10 is presented. The example composite panoramic vision system 10 is illustrated as integrated into a particular type of work vehicle, here a wheeled loader 12, but can be integrated into various other types of work vehicles in further embodiments. The wheeled loader 12 includes a chassis 14 supported by four ground-engaging wheels 16 and upon which an operator station or cabin 18 is positioned. The example wheeled loader 12 further includes a front bucket 20 mechanically linked to a forward portion of the chassis 14 by a boom assembly 22. Further shown are various other features of the wheeled loader 12 including an engine bay and surrounding infrastructure (referred to herein as "engine bay housing 24"), as well as four wheel fenders 26. Additional structural features of the example wheeled loader 12 are also shown and discussed below in connection with FIGS. 3 and 4.

The example composite panoramic vision system 10 includes three rear vehicle cameras 28, 30, 32, which are arranged in a highly-distributed camera array 34. The positioning of the cameras 28, 30, 32 within the highly-distributed camera array 34 is generally indicated by camera icons shown in FIG. 1, which are enlarged for visual clarity. As generically illustrated, the vehicle camera 28 may be mounted to a leftmost portion of the wheeled loader 12, such as on or adjacent the wheel fender 26 of the left rear wheel 16 or left sidewall of the engine bay housing 24 of the loader 12; the vehicle camera 30 may be mounted to a laterally-central portion of the wheeled loader 12, such as to an upper trailing edge of the engine bay housing 24 or immediately aft of the engine bay housing 24; and the vehicle camera 32 may be mounted to a rightmost portion of the wheeled loader 12, such as on or adjacent the wheel fender 26 of the right rear wheel 16 or the right sidewall of the engine bay housing 24 of the loader 12. Again, these and other possible camera dispositions are discussed below in conjunction with FIGS. 3 and 4. As noted above, the terms "left," "center" or "central," and "right" are defined relative to the orientation of an operator when seated in the cabin 18 and facing in a forward direction. Given the relative positioning of the rear vehicle cameras 28, 30, 32, the camera 28 mounted to the leftmost portion of the wheeled loader 12 is referred to hereafter as the "left rear vehicle camera 28." The camera 28 more centrally mounted to the wheeled loader 12 is referred to as the "central rear vehicle camera 30." Finally, the camera 32 mounted to the rightmost portion of the wheeled loader 12 is referred to as the "right rear vehicle camera 32." The rear vehicle cameras 28, 30, 32 have generally conical FOVs 36, 38, 40, respectively, which overlap or coincide in FOV overlap regions 42 (FIG. 1).

As indicated in the schematic of FIG. 1, the left rear vehicle camera 28 and the right rear vehicle camera 32 may be angled outwardly away from the body of the wheeled loader 12 to provide the camera array 34 and, therefore, the below-described composite panoramic image 56 with a broader (wider angle) FOV. The illustrated positioning and angular orientation of the vehicle cameras 28, 30, 32 and the corresponding camera FOVs 36, 38, 40 is provided merely by way of example. In alternative implementations, the vehicle cameras 28, 30, 32 may be otherwise positioned, may have other (e.g., broader angle) individual FOVs, or a different number of cameras may be present, providing at least two vehicle cameras are included in embodiments of the composite panoramic vision system 10. Further, while primarily described below as video cameras capturing imagery falling within the visible band of the electromagnetic spectrum, other types of imaging devices (e.g., infrared cameras) can also be integrated into the composite panoramic vision system 10 in alternative implementations, with the imagery captured by such devices presented on the below-described composite panoramic display accordingly.

The rear vehicle cameras 28, 30, 32 are operably coupled to (that is, are in signal communication with) a controller 44 further included in the composite panoramic vision system 10 and schematically depicted in FIG. 2. The connections between the rear vehicle cameras 28, 30, 32 and the controller 44 are represented by signal communication lines 46, which may represent either wireless or wired data connections. The controller 44 of the composite panoramic vision system 10 can assume any form suitable for performing the functions described throughout this document. Further, the term "controller," as appearing herein, is utilized in to generally refer to the processing architecture of composite panoramic vision system 10. The controller 44 can encompass or may be associated with any practical number of processors (central and graphical processing units), control computers, navigational equipment pieces, computer-readable memories, power supplies, storage devices, interface cards, and other standardized components. The controller 44 may also include or cooperate with any number of firmware and software programs or computer-readable instructions designed to carry-out the various process tasks, calculations, and control/display functions described herein. Such computer-readable instructions may be stored within a non-volatile sector of a memory 50 associated with the controller 44. While generically illustrated in FIG. 2 as a single block, the memory 50 can encompass any number and type of storage media suitable for storing computer-readable code or instructions, as well as other data utilized to support the operation of the composite panoramic vision system 10. The memory 50 may be integrated into the controller 44 in embodiments as, for example, a system-in-package, a system-on-a-chip, or another type of microelectronic package or module.

The composite panoramic vision system 10 further includes an operator interface 48, which is operably coupled to (in signal communication with) the controller 44. As generically illustrated in FIG. 2, the operator interface 48 can be any device or group of devices utilized by an operator of the wheeled loader 12 to input data into or otherwise control the composite panoramic vision system 10. In various implementations, the operator interface 48 may be integrated into or otherwise associated with the below-described display device 52. In this regard, the operator interface 48 may include physical inputs (e.g. buttons, switches, dials, or the like) located on or proximate the display device 52, a touchscreen module integrated into the display device 52, or a cursor input device (e.g., a joystick, trackball, or mouse) for positioning a cursor utilized to interface with GUI elements generated on the display device 52, as further described below. It should be understood that the operator interface 48, then, may include any number and type of operator input devices for receiving operator input commands including devices for interacting with GUIs, for receiving verbal input or voice commands, and/or for recognizing operator gesture commands, to list but a few examples.

The display device 52 may be affixed to the static structure of the operator cabin 18 and realized in a head-down display (HDD) configuration in embodiments. In other embodiments, the display device 52 can assume the form of a portable electronic display device, such as a tablet computer or laptop, which is carried into the operator station (e.g., the cabin 18 of the wheeled loader 12) by an operator and which communicates with the various other components of the work vehicle composite panoramic vision system 10 over a physical connection or wireless connection to perform the below-described display functionalities. The controller 44 may also receive various other sensor data, depending upon implementation, utilized in the generation of the below-described composite panoramic rear display 54. For example, and as further schematically shown in FIG. 2, the composite panoramic vision system 10 can include other work vehicle sensors 80, including distance measuring equipment (DME) or sensor arrays (e.g., laser, millimeter wavelength radar, or sonar (ultrasound) sensor arrays) for detecting obstacles in the FOVs of the rear vehicle cameras 28, 30, 32.

With continued reference to FIGS. 1 and 2, and referring specifically to FIG. 2, an output of the controller 44 is coupled to an input of the display device 52. During operation of the composite panoramic vision system 10, the controller 44 provides video output signals to display device 52 to generate a composite panoramic rear display 54 on a display screen of the display device 52. The composite panoramic rear display 54 features a composite panoramic rear image 56, which is compiled by the controller 44 utilizing the camera feeds provided by the cameras 28, 30, 32 within the highly-distributed camera array 34. Example techniques suitably utilized by the controller 44 in generating the composite panoramic rear image 56, which is included within the composite panoramic rear display 54 (whether alone or in combination with other visual elements, such as GUI icons) are discussed below in connection with FIGS. 5 and 6. Regardless of the particular manner in which the image 56 is generated, the composite panoramic rear image 56 provides an expansive, wide angle view of the exterior environment to the rear of the wheeled loader 12, as indicated in FIG. 2 by an arrow graphic 58.

As just noted, the composite panoramic rear display 54 may include other graphic elements in addition to the composite panoramic rear image 56. For example, and as further indicated in FIG. 2, the composite panoramic rear display 54 may be generated to include a number of GUI icons 60, 62, 64. When present, GUI icons 60, 62, 64 may be superimposed over the composite panoramic rear image 56, displayed adjacent the upper or lower edge or border of the composite panoramic rear image 56, or otherwise visually integrated into the composite panoramic rear display 54. When present, the GUI icons 60, 62, 64 may provide an intuitive mechanism for navigating between the composite panoramic rear image 56 and a number of single camera feeds 66, 68, 70 provided by rear vehicle cameras 28, 30, 32, respectively. In the instant example, the single camera feed 66 corresponds to the video feed or imagery captured by the left rear vehicle camera 28 and is thus referred to herein as the "left rear vehicle camera feed 66." Similarly, the single camera feed 68 corresponds to the video feed captured by the central rear vehicle camera 30 and is referred to herein as the "central rear vehicle camera feed 68." Finally, the single camera feed 70 corresponds to the video feed captured by the right rear vehicle camera 32 and is further referred to as the "right rear vehicle camera feed 70." When selected for presentation on the display device 52, a given single camera feed 66, 68, 70 may be scaled, cropped, and otherwise fit to occupy the entirety or the substantial entirety of the display screen of the display device 52. The selected single camera feed 66, 68, 70 may be displayed without concurrent display of the composite panoramic rear image 56 in embodiments; while, in other embodiments, the selected single camera feed 66, 68, 70 may be displayed concurrently with the composite panoramic rear image 56, while visually emphasizing the selected single camera feed 66, 68, 70 in some manner (e.g., by presenting the selected single camera feed 66, 68, 70 in a relatively large window superimposed over the composite panoramic rear image 56).

In the above-described manner, an operator may select a given GUI icon 60, 62, 64 to navigate to the single camera feed 66, 68, 70 corresponding to the selected GUI icon. An operator may enter such a GUI icon selection utilizing any suitable input received via the operator interface 48, such as cursor device input or touch input if the display device 52 possesses touchscreen capabilities. From any selected single camera feed 66, 68, 70, the operator may then return to the composite panoramic rear display 54 in some manner; e.g., by selection of a GUI icon 72 superimposed over (or otherwise displayed in conjunction with) the selected feed 66, 68, 70. In this manner, an operator can freely select any particular image or feed 56, 66, 68, 70 for display on the display device 52 at a given juncture in time. For example, in certain embodiments, the composite panoramic rear display 54 may be initially presented on the display screen by default to provide an operator with a comprehensive, wide angle FOV of the work area to the aft the wheeled loader 12 upon system startup. The operator may then select a particular icon 60, 62, 64 to switch to presentation of a particular camera feed 66, 68, 70 to more closely examine or focus attention on an item of interest in the feed 66, 68, 70. The selected camera feed 66, 68, 70 will typically be scaled upwardly to best fit the display screen and, therefore, may be larger and more detailed than the portion of the feed 66, 68, 70 included within the composite panoramic rear display 54. In certain instances, by presenting a single image on the display screen of the display device 52, limited portions of the camera feeds 66, 68, 70 may also become visible that are excluded from the composite panoramic rear display 54, as further discussed below.

In the illustrated example, and as noted above, the GUI icons 60, 62, 64 are spaced alongside an edge or border (e.g., the bottom or top edge) region of the composite panoramic rear display 54, with the GUI icon 60 (selectable to summon the left rear vehicle camera feed 66) located in a bottom left corner of the composite panoramic rear display 54, the GUI icon 62 (selectable to summon the central rear vehicle camera feed 68) located in a bottom central portion of the composite panoramic rear display 54, and the GUI icon 64 (selectable to summon the right rear vehicle camera feed 70) located in a bottom right corner of the composite panoramic rear display 54. This again allows rapid visual association of the GUI icons 60, 62, 64 with the corresponding individual camera feeds provided from the rear vehicle cameras 28, 30, 32. Additionally, as indicated in FIG. 2, the GUI icons 60, 62, 64 may be generated as camera icons for further rapid visual association with the camera feeds. In other embodiments, the positioning and appearance of the GUI icons 60, 62, 64 included in the composite panoramic rear display 54 may vary.

In at least some implementations, the controller 44 may be configured to automatically switch from presentation of the composite panoramic rear image 56 to presentation of a single camera feed 66, 68, 70 in response to a predefined trigger event. In such implementations, the trigger event may be based upon: (i) whether an obstacle is detected to the rear of the wheeled loader 12, and (ii) when so detected, whether the distance between the detected obstacle and the rear of the loader 12 is less than a threshold value, as measured along a fore-aft centerline or longitudinal axis 74 of the loader 12. To enable the controller 44 to automatically switch to a single camera feed in response to a detected obstacle within a predetermined proximity of the wheeled loader 12, the composite panoramic vision system 10 is equipped with some form of obstacle detection system or device. In certain embodiments, obstacle detection may be accomplished by processing the imagery contained in the camera feeds received from the cameras 28, 30, 32. Alternatively, the controller 44 may utilize data received from the work vehicle sensors 80 indicating the location of any obstacles detected to the rear of the wheeled loader 12.

Continuing the description from the foregoing paragraph, consider an example scenario in which an obstacle is detected behind the wheeled loader 12 in the location generally indicated by a marker 76 in FIG. 1 (hereafter, "obstacle 76"). The controller 44 receives data indicating the current position of the obstacle 76 relative to the aft end of the wheeled loader 12. The controller 44 can further map or correlate the position of the object with the spatial volumes encompassed by the camera FOVs 36, 38, 40, which are known to the controller 44. Processing this data, the controller 44 further determines that the obstacle 76 is within the threshold distance (possibly corresponding to the distance to the below-described 2D calibration plane 78, as taken along the longitudinal axis 74). In response to this determination, the controller 44 then further identifies the camera 28, 30, 32 positioned to best visually capture the detected obstacle 76. Lastly, the controller 44 automatically (that is, without requiring user input) switches to presentation of the appropriate camera feed on the display device 52. Thus, in the instant example, the controller 44 determines that the position of the detected obstacle 76 (FIG. 1) resides entirely or at least predominately within the FOV 40 of the right rear camera 32 and then transitions the display device 52 from displaying the composite panoramic rear display 54 to display of the single camera feed 70 on the display device 52. Additional description of such an automatic display switching process is further provided in connection with FIGS. 5 and 6. First, however, example spatial distributions or positionings of the vehicle cameras 28, 30, 32 within the highly-distributed camera array 34 is discussed below in conjunction with FIGS. 3 and 4.

Figure 3:
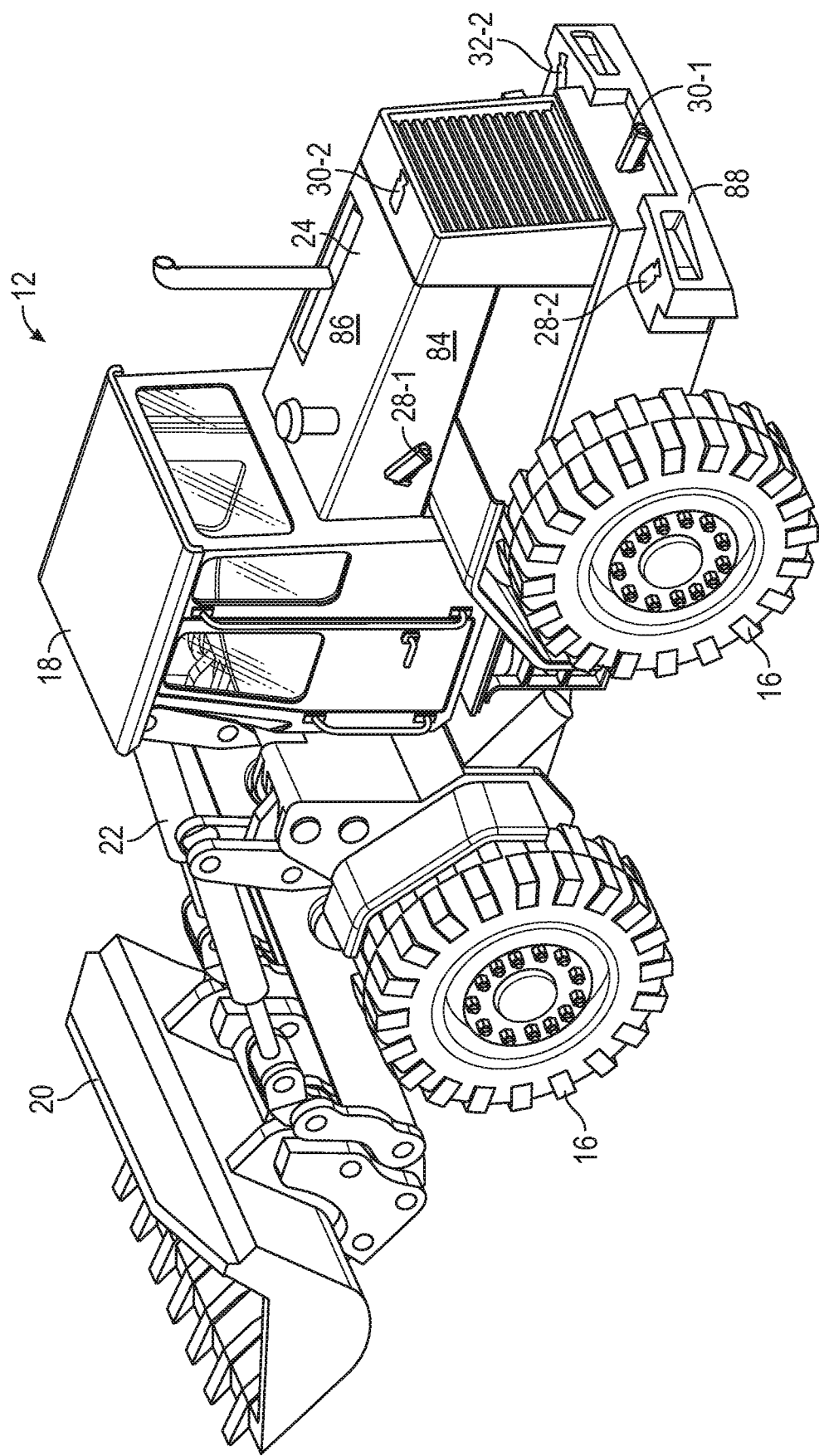
FIGS. 3 and 4 are left and right side views, respectively, of the wheeled loader shown in FIGS. 1-2, which depict potential spatial arrangements of the vehicle-mounted cameras contained in the highly-distributed camera array.
Figure 4:
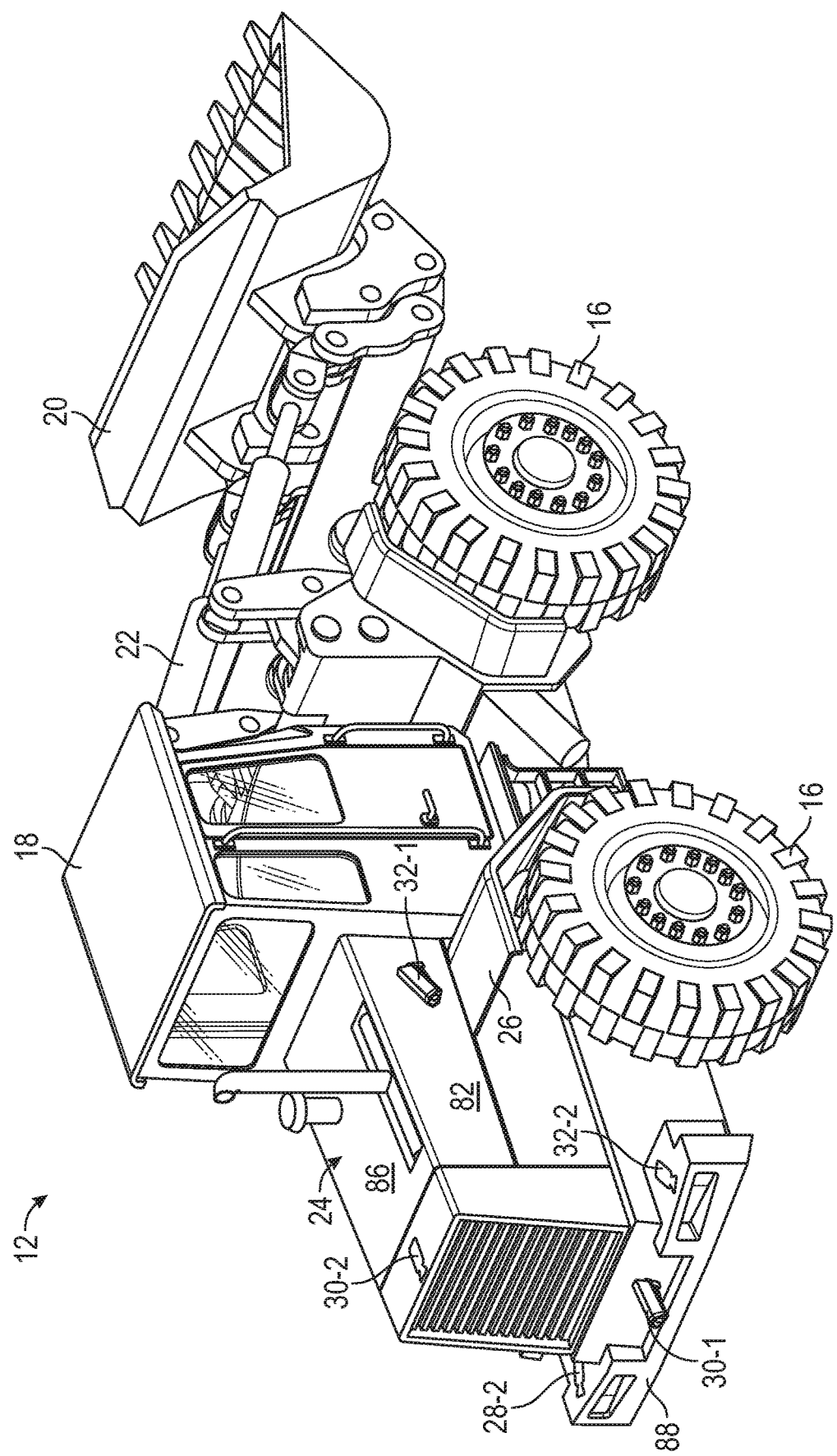

Turning to FIGS. 3 and 4, left and right isometric side views of the wheeled loader 12 are shown to illustrate potential spatial arrangements of the vehicle cameras 28, 30, 32 when included in the highly-distributed camera array 34. More specifically, a first potential positioning of the vehicle cameras 28, 30, 32 within the camera array 34 is shown in FIGS. 3 and 4, with the suffix "-1" appended to each reference numeral 28-1, 30-1, 32-1 to denote that the illustrated positioning of the vehicle cameras represents but one possible spatial disposition among numerous other possible spatial dispositions of the vehicle cameras. Additionally, a second potential positioning of the vehicle cameras 28, 30, 32 is also presented in these drawing figures, but represented utilizing two dimensional icons and identified with the suffix "-2." Addressing first the positioning of the vehicle cameras 28-1, 30-1, 32-1, it can be seen that the left rear vehicle camera 28-1 (FIG. 3) is mounted to a left sidewall 84 of the engine bay housing 24, while the right rear vehicle camera 32-1 (FIG. 4) is mounted to a right sidewall 82 of the engine bay housing 24 in the illustrated example. The left and right rear vehicle cameras 28-1, 32-1 are also referred to below as the "outer rear vehicle cameras 28-1, 32-1" in view of their outside lateral positioning relative to the central rear vehicle camera 30-1. The outer rear vehicle cameras 28-1, 32-1 thus lack a LOS relationship due to the presence of the engine bay housing 24, which blocks a LOS view from either of the rear vehicle cameras 28-1, 32-1 to the other rear vehicle cameras 28-1, 32-1.

In addition to lacking a LOS relationship, the outer rear vehicle cameras 28-1, 32-1 may have a relatively wide or broad camera-to-camera spacing; e.g., in embodiments, the camera-to-camera spacing between the outer rear vehicle cameras 28-1, 32-1 may be greater than 1 meter and, perhaps, may range from about 1.5 meters to about 5 meters. The left rear vehicle camera 28-1 and the right rear vehicle camera 32-1 are located closer to the left and right rear wheels 16 of the wheeled loader 12, respectively, than to the longitudinal axis 74 of the loader 12 (FIG. 1), as taken along a lateral axis perpendicular to the longitudinal axis 74 (and parallel to the rotational axis of the wheels 16). Comparatively, the central rear vehicle camera 30-1 is mounted to a rear fender 88 of wheeled loader 12 and may be substantially aligned with the longitudinal axis 74 of the loader 12, as seen from a top-down or planform viewpoint (that is, looking downwardly onto the loader 12 as shown in FIG. 1). The central rear vehicle camera 30-1 may also lack a LOS relationship with the outer rear vehicle cameras 28-1, 32-1 due to, for example, visual interference by the engine bay housing 24; again, the term "visual interference," as utilized in this context, indicating that a LOS between the vehicle cameras 28-1, 32-1 is blocked by infrastructure (herein, the engine bay housing 24) of the wheeled loader 12. Also, in the instant example, the central rear vehicle camera 30-1 is located at a different vertical elevation compared to the outer rear vehicle cameras 28-1, 32-1. In various embodiments, the differential in vertical elevation from the central rear vehicle camera 30-1 to either of the outer rear vehicle cameras 28-1, 32-1 may range from about 1 meter to about 3 meters, as taken along a vertical axis perpendicular to the longitudinal axis 74 (FIG. 1). In other instances, the vehicle cameras 28-1, 30-1, 32-1 may be mounted to the wheeled loader 12 at the same or substantially the same vertical elevation.

Various other spatial distributions for the cameras within the camera array 34 (FIGS. 1-2) are possible in further embodiments. Further emphasizing this point, an alternative example spatial disposition of the rear vehicle cameras 28, 30, 32 is presented in FIGS. 3-4 utilizing the rear camera icons 28-2, 30-2, 32-2 (also referred to herein as the "vehicle cameras 28-2, 30-2, 32-2"). In this secondary example, the left and right rear vehicle cameras 28-2, 32-2 are mounted to laterally-opposed (left and right) corner regions of the rear fender 88 of the wheeled loader 12, while the central rear vehicle camera 30-2 is mounted to an upper surface or topside 86 of the engine bay housing 24. As was previously the case, the camera-to-camera spacing between different pairs of cameras 28-2, 30-2, 32-2 may be relatively broad or expansive; e.g., the spacing between the left and right rear vehicle cameras 28-2, 32-2 may exceed 1 meter in embodiments. Again, the left and right rear vehicle cameras 28-2, 32-2 may be located closer to the left and right rear wheels 16 than to the longitudinal axis 74 (FIG. 1) of the wheeled loader 12; while the central rear vehicle camera 30-2 may be substantially aligned with the longitudinal axis 74, as seen from a top-down or planform view point. Additionally, at least some, if not all of the vehicle cameras 28-2, 30-2, 32-2 may lack a LOS relationship due to the presence of visually obtrusive features of the wheeled loader 12, such as the sidewalls 82, 84 and topside 86 of the engine bay housing 24.

Two example camera dispositions of the highly-distributed camera array 34 have thus been described, noting that the above-described camera positions can be mixed or interchanged in further embodiments; e.g., in alternative implementations, the camera array 34 may contain vehicle cameras mounted to the wheeled loader 12 at the locations corresponding to the cameras or icons 28-1, 30-2, 32-1 or at the locations corresponding to the cameras or icons 28-2, 30-1, 32-2. In still other instances, the central rear vehicle camera 30 may be mounted at a different location of the wheeled loader 12 (e.g., to trailing edge of the upper surface of the cabin 18), and/or the right and left rear vehicle cameras 28, 32 may be mounted to the right and left wheel fenders 26, respectively, as mentioned above in connection with FIG. 1. Numerous other camera dispositions within the camera array 34 are also possible, as will vary based upon the desired FOV of the composite panoramic image 56, the type of work vehicle into which the composite panoramic vision system 10 is integrated, and other such factors. Finally, while the camera array 34 contains three vehicle cameras in the example embodiment, the composite panoramic vision system 10 can contain fewer vehicle cameras or a greater number of vehicle cameras in further embodiments, providing that the vehicle-mounted camera array includes at least two vehicle cameras having partially overlapping FOVs.

Figure 5:
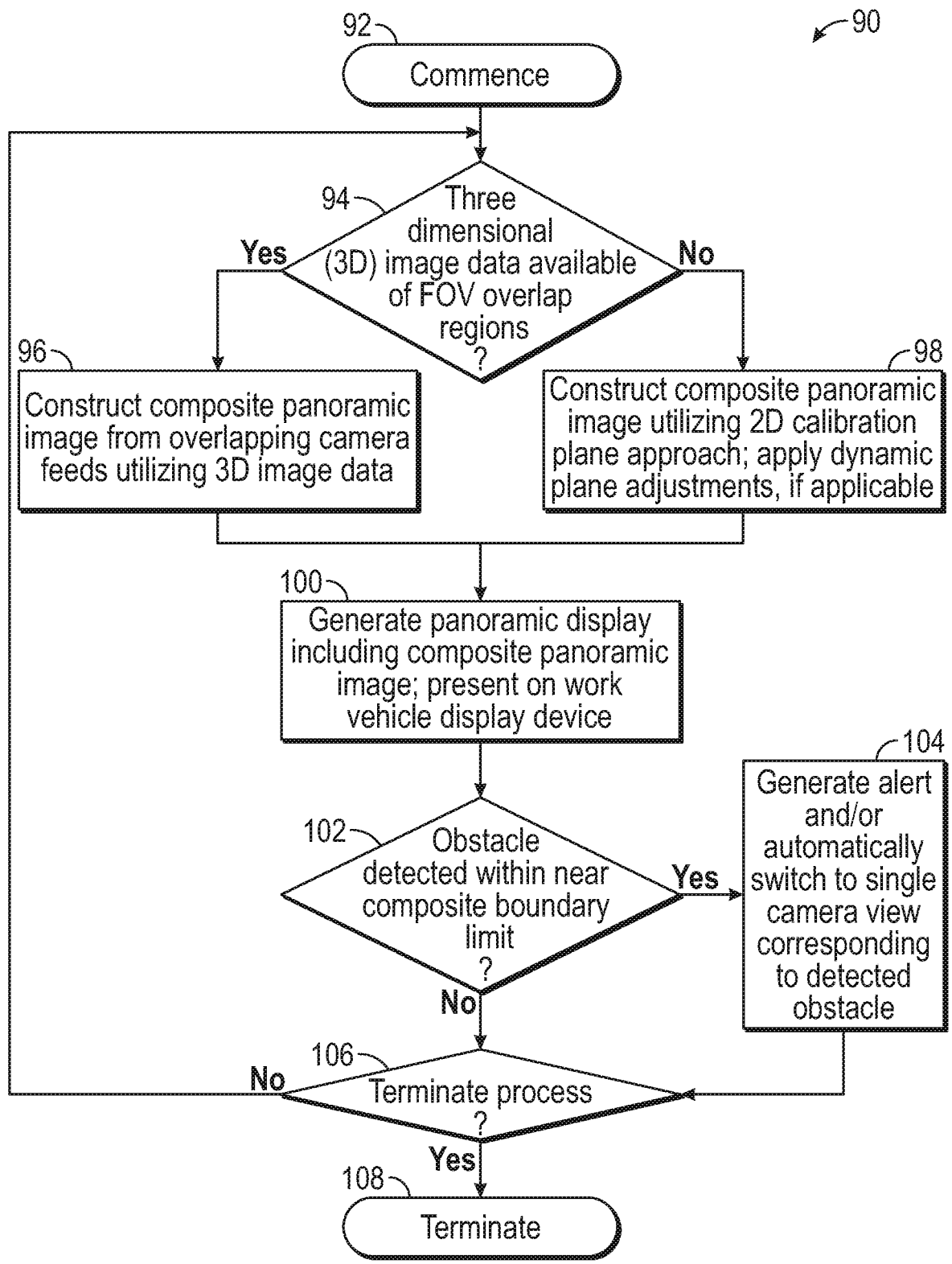
FIG. 5 is a flowchart setting-forth an example process suitably carried-out by the controller of the composite panoramic vision system shown in FIGS. 1-4.

Advancing to FIG. 5, there is shown a composite panoramic display process 90 suitably carried-out by the controller 44 (FIG. 2) in embodiments of the present disclosure. The composite panoramic display process 90 includes a number of process STEPS 92, 94, 96, 98, 100, 102, 104, 106, 108, each of which is described below. Depending upon the particular manner in which the composite panoramic display process 90 is implemented, each step generically illustrated in FIG. 5 may entail a single process or multiple sub-processes. Further, the steps illustrated in FIG. 5 and described below are provided by way of non-limiting example only. In alternative embodiments of the composite panoramic display process 90, additional process steps may be performed, certain steps may be omitted, and/or the illustrated process steps may be performed in alternative sequences.

The controller 44 commences performance of the composite panoramic display process 90 at STEP 92 in response to the occurrence of a predetermined trigger event. In certain instances, the controller 44 may commence performance of the composite panoramic display process 90 in response to startup of the wheeled loader 12 or, perhaps, in response to activation of the composite panoramic vision system 10 itself. In other instances, the controller 44 may commence performance of the process 90 when detecting that the wheeled loader 12 has been shifted into reverse, in essence to execute a "backup camera" functionality. In still other instances, the controller 44 may commence composite panoramic display process 90 in response to a different trigger event, such the receipt of operator input via the operator interface 48 indicating that the composite panoramic display process 90 is desirably executed.

After commencing the composite panoramic display process 90 (STEP 92), the controller 44 advances to STEP 94 and determines (yes or no) whether there exists camera-specific 3D image data available for the FOV overlap regions 42 (FIG. 1); that is, the 3D image data captured from the vantage point of each camera included in the highly-distributed camera array 34. Camera-specific 3D image data may be available when the composite panoramic display process 90 is capable of capturing depth measurements of physical objects or features within the FOVs 36, 38, 40 of the cameras 28, 30, 32; or, at minimum, within the FOV overlap regions 42 shared by the cameras 28, 30, 32. As previously described, this may be the case when the vehicle cameras 28, 30, 32 are stereoscopic in nature and each vehicle camera possess two (or more) lenses or is otherwise capable of capturing 3D image data. In other instances, the composite panoramic display process 90 may be capable of capturing depth measurements within the camera FOVs 36, 38, 40 utilizing another type of sensor. Again, in this latter case, such other sensor data ideally provides depth readings from the vantage point of each vehicle camera 28, 30, 32, which can be spatially mapped to the imagery captured by the cameras 28, 30, 32. If such camera-specific 3D image data is available, the controller 44 progresses to STEP 96 of the process 90 and constructs the composite panoramic rear image 56 by merging the images received from the rear vehicle cameras 28, 30, 32 utilizing the collected 3D image data. Such camera-specific 3D image consolidation techniques will vary between embodiments, but may generally involve alignment of pixels within the 3D space locations within the FOV overlap regions 42 to appropriately align the different camera feeds.

Generally, the image fidelity of the composite panoramic rear image 56 (that is, the accuracy with which the rear image 56 depicts the real-world environment within the FOVs 36, 38, 40 of the rear vehicle cameras 28, 30, 32) may be maximized when consolidating the camera feeds utilizing camera-specific 3D image data. Such an 3D image consolidation approach may place relatively high processing loads on the controller 44, however, and may involve undesirably high manufacturing costs in fabricating the composite panoramic vision system 10 to include stereoscopic cameras (or other camera-specific depth sensors) capable of collecting depth measurements within the FOV overlap regions 42. Consequently, in embodiments, the composite panoramic vision system 10 may not be capable of capturing or may not be utilized to capture camera-specific 3D image data. In this case, a different approach or technique is utilized by controller 44 in generating the composite panoramic rear image 56, as indicated by STEP 98 of the composite panoramic display process 90. For example, in this latter instance, the controller 44 may utilize a 2D mesh or stereo calibration technique to consolidate the camera feeds received from the rear vehicle cameras 28, 30, 32 and yield the composite panoramic rear image 56, as discussed below.

When a 2D mesh or stereo calibration technique is employed by the controller 44 during STEP 98, the controller 44 may generate a disparity map (depth image) of the FOV overlap regions 42 utilizing the different camera feeds. This disparity map is then utilized to align the separate camera feeds in generating the composite panoramic rear image 56. Image stitching or panoramic view generation may be carried-out by the controller 44 utilizing feature extraction or recognition, with corresponding features utilized to consolidate the images captured by the rear vehicle cameras 28, 30, 32; e.g., through the usage of homography matrix relationships. In various embodiment, for calibration purposes, the controller 44 may establish the spacing between a 2D calibration plane (e.g., the plane 78 shown in FIG. 1) and the aft end or trailing end of the wheeled loader 12. As noted above, the 2D calibration plane may be orthogonal to the longitudinal axis 74 of the wheeled loader 12 (or other work vehicle) and is spaced from the loader 12 by a sufficient longitudinal distance to transect the FOV overlap regions 42 of the camera FOVs 36, 38, 40. In embodiments, during STEP 98 of the process 90, the controller 44 performs feature mapping in areas in which the FOV overlap regions 42 intersect with the calibration plane 78 to determine the spatial relationship of FOVs 36, 38, 40 and, therefore, the manner in which the feeds 66, 68, 70 are properly merged to yield the composite panoramic rear image 56.

The above-described 2D calibration plane approach advantageously allows the consolidation of images or camera feeds captured from markedly different vantage points to yield the composite panoramic rear image 56 in a relatively straightforward manner, moderating the processing demands placed on the controller 44 and avoiding the need for the capture of camera-specific 3D data. Generally, such an approach yields a high fidelity, undistorted image for obstacles located on or immediately aft of the 2D calibration plane 78 (that is, behind the plane 78 from the perspective of the wheeled loader 12), such as the obstacle 112 shown in FIG. 1. However, image distortion or other visual aberrations may occur for obstacles located closer to the wheeled loader 12 than is the 2D calibration plane 78 and for obstacles beyond the calibration plane 78 (from the perspective of the wheeled loader 12) by some distance. Specifically, when an obstacle is located closer to the wheeled loader 12 than the 2D calibration plane 78, display of the obstacle image (or portions of the obstacle image) may be suppressed on the composite panoramic rear image 56. Conversely, when an obstacle is located beyond the calibration plane 78 (e.g., at the location 114 shown in FIG. 1) by some distance, the object may be visually duplicated in the composite panoramic rear image 56. To help minimize such visual aberrations, a dynamic or movable calibration plane approach may be employed, as described below.

In embodiments in which a dynamic calibration plane approach, the calibration plane 78 may be moved virtually by the controller 44 within a predetermined longitudinal range, as indicated by arrows 116, 118 in FIG. 1. For example, the controller 44 may move the 2D calibration plane 78 to intersect or to be located immediately forward of (that is, closer to the wheeled loader 12) than an obstacle located within the camera FOVs 36, 38, 40, as detected by DME (or other obstacle detection sensors) included in the work vehicle sensors 80 (FIG. 2). The controller 44 may move the calibration plane 78 in the direction indicated by arrow 118 up to a near or proximal plane boundary 110, which terminates at or just before the location at which FOV overlap regions 42 begin, as taken along the longitudinal axis 74 moving away from the vehicle's rear or aft end. Stated differently, the controller 44 may adjust the position of the 2D calibration plane 78 in accordance with the movement of a monitored obstacle up to, but generally not beyond (in the direction of arrow 118), the proximal calibration plane boundary ($PB_{NEAR}$) 110 at which a minimum longitudinal spacing exists between the 2D calibration plane 78 and the aft end of the wheeled loader 12. Similarly, the controller 44 may also move the 2D calibration plane 78 relative to the wheeled loader 12 in the opposing longitudinal or axial direction, as indicated by arrow 116, up to a predefined far or distal calibration plane boundary ($PB_{FAR}$) 120 (FIG. 1). When multiple obstacles are detected (e.g., by DME included in the work vehicle sensors 80), the controller 44 may move the calibration plane 78 to intersect or to be located immediately forward of the obstacle located closest the wheeled loader 12. In this manner, the image fidelity for an obstacle of interest located closest the aft end of the wheeled loader 12 (and thus typically the most demanding of operator attention) may be maintained with minimal, if any aberrations of the obstacle's image as appearing on the composite panoramic rear image 56. In other embodiments, the calibration plane 78 may be moved in accordance with other data (e.g., in response to operator input received via operator interface 48 adjusting a setting) or the 2D calibration plane 78 may not be movable relative to the wheeled loader 12.

With continued reference to FIG. 5, at STEP 100 of the composite panoramic display process 90, the controller 44 combines the camera feeds provided by the rear vehicle cameras 28, 30, 32 to yield the composite panoramic rear image 56 and presents this image in the composite panoramic rear display 54 appearing on the display device 52. An example of the composite panoramic rear image 56 is shown in FIG. 6, with like reference numerals carried-over from FIG. 2 (but without inclusion of the icons 60, 62, 64). In this example, the left rear vehicle camera feed 66, the central rear vehicle camera feed 68, and the right rear vehicle camera feed 70 are shown in the upper left corner, upper middle region, and upper right corner of FIG. 6, respectively. In this example, three obstacles appear in the composite panoramic rear image 56: a neighboring or nearby work vehicle 124, a telephone poll 126, and a pile of material 128. Additionally, the respective FOVs of the left rear vehicle camera feed 66 and the right rear vehicle camera feed 70 capture structural interference or visual hinderance in the form of the left sidewall 84 and the right sidewall 82 of the engine bay housing 24, respectively.

The arrows 122 in FIG. 6 represent the manner in which the composite panoramic rear image 56 is constructed from the single camera feeds 66, 68, 70. Notably, in the composite panoramic rear image 56, all three obstacles 123, 126, 128 are visible, while the rear image 56 provides a non-disjointed image lacking (or having relatively few) visual aberrations. Comparatively, none of the single camera feeds 66, 68, 70 captures all three of these obstacles 124, 126, 128. Further, if all three single camera feeds 66, 68, 70 were concurrently presented (e.g., in a side-by-side format) on the display device 52, this would create a more disjointed display with areas of visual redundancy, as may be appreciated by comparing the single camera feeds 66, 68, 70 to the composite panoramic rear image 56 shown in the lower portion of this drawing figure. Thus, by generating a single composite panoramic rear image 56 from the camera feeds 66, 68, 70 for presentation on the display device 52, the composite panoramic vision system 10 provides a more comprehensive view of the surrounding environment of the wheeled loader 12 to enhance the situational awareness of the vehicle operator at a glance. Additionally, the controller 44 may remove visual obstructions of the wheeled loader 12 from the composite panoramic rear image 56 when possible, as indicated by the absence of sidewalls 82, 84 and of the engine bay housing 24 in the composite panoramic rear image 56. Accordingly, in embodiments in which a LOS between a first vehicle camera and a second vehicle camera is blocked by an intervening structure of the work vehicle (e.g., sidewalls 82, 84 in the example of FIG. 6), the controller 44 may visually remove the intervening structure from the composite panoramic image 56 when capable of doing; e.g., by visually filling-in the regions of the vehicle environment visually blocked by the intervening structural feature visible in a particular camera feed utilizing the appropriate imagery captured by another camera feed in the FOV overlap region shared by the camera feeds.

Returning again to FIG. 5, after generating the composite panoramic rear image 56 on the display device 52 (STEP 100), the controller 44 advances to STEP 102 of the composite panoramic display process 90. During this step, the controller 44 may be configured to automatically switch from presentation of the composite panoramic rear image 56 to presentation of a single camera feed 66, 68, 70 in response to a predefined trigger event. As discussed above in connection with FIG. 1, such trigger event may be based upon whether (yes or no) an obstacle is detected within at least one of the camera FOVs; and, if so, whether the detected obstacle is within a predetermined distance of the wheeled loader 12. If, during STEP 100, the controller 44 determines that these (or similar) conditions are satisfied, the controller 44 switches from presentation of the composite panoramic image 56 on the display device 52 (if currently displayed) to presentation of the single camera view in which the detected obstacle is visible. In embodiments in which the controller 44 utilizes a 2D calibration plane in generating the composite panoramic rear image 56, the predetermined distance may be equal to or greater than to a distance at which the FOV overlap regions 42 (FIG. 1) begin, as taken along the longitudinal axis 74 moving away from the wheeled loader 12 and toward the plane 78 (to the left in FIG. 1). As a more specific example, if determining that the material pile 128 has moved into relatively close proximity of the rear of the wheeled loader 12 and breached the near calibration plane boundary 110 (e.g., due to reverse travel of the loader 12), the controller 44 may automatically switch to presentation of the signal camera feed 70 captured by the right rear vehicle camera 32, as shown in the upper right corner of FIG. 6. In other embodiments, the controller 44 may generate a visual and/or audible alert in conjunction with or in lieu of automatically transitioning to display of a single camera feed when an obstacle is detected within relatively close proximity of the wheeled loader 12, as previously described.

Lastly, the controller 44 of the composite panoramic vision system 10 progresses to STEP 106 of the composite panoramic display process 90 (FIG. 5). During STEP 106, the controller 44 determines whether (yes or no) termination of the composite panoramic display process 90 is warranted; e.g., due to operator input requesting termination of the process 90 or due to shutdown of the wheeled loader 12. If determining that the composite panoramic display process 90 should be terminated, the controller 44 progresses to STEP 108 and terminates the current iteration of the composite panoramic display process 90 accordingly. Otherwise, the controller 44 returns to the STEP 94 and the above-described process steps of the composite panoramic display process 90 repeat. By performing the composite panoramic display process 90 in this manner, the controller 44 may repeatedly update the composite panoramic rear image 56 and perform the other display-related functionalities (e.g., the above-described alerting and automatic camera switching functioning) on a relatively rapid (e.g., real-time) basis.

Enumerated Examples of the Work Vehicle Composite Panoramic Vision System

The following examples of the work vehicle composite panoramic vision system are further provided and numbered for ease of reference.

1. A composite panoramic vision system, which is utilized onboard a work vehicle having an operator station, is disclosed. In embodiments, the composite panoramic vision system includes a display device utilized within an operator station of the work vehicle, a vehicle-mounted camera array, and a controller. The vehicle-mounted camera array includes, in turn, a first vehicle camera mounted to the work vehicle, having a first Field of View (FOV), and positioned to capture a first camera feed of the work vehicle's exterior environment from a first vantage point; and a second vehicle camera mounted to the work vehicle, having a second FOV partially overlapping with the first FOV, and positioned to capture a second camera feed of the work vehicle's exterior environment from a second vantage point. The controller is operably coupled to the display device, to the first vehicle camera, and to the second vehicle camera. The controller is configured to: (i) receive the first and second camera feeds from the first and second cameras, respectively; (ii) generate a composite panoramic image of the work vehicle's exterior environment from at least the first and second camera feeds; and (iii) present the composite panoramic image on the display device for viewing by an operator of the work vehicle.

2. The work vehicle composite panoramic vision system of example 1, wherein a line of sight (LOS) between the first vehicle camera and the second vehicle camera is blocked by an intervening structure of the work vehicle.

3. The work vehicle composite panoramic vision system of example 2, wherein the intervening structure is visible in at least one of the first FOV and the second FOV. The controller is further configured to visually remove the intervening structure from the composite panoramic image when generating the composite panoramic image from at least the first and second camera feeds.

4. The work vehicle composite panoramic vision system of example 1, wherein the first vehicle camera and the second vehicle camera assume the form of a left rear vehicle camera and a central rear vehicle camera, respectively. Additionally, the vehicle-mounted camera array further includes a right rear vehicle camera having a third FOV partially overlapping with the second FOV, while positioned to capture a third camera feed of the work vehicle's exterior environment from a third vantage point. The controller is further operably coupled to the right rear vehicle camera and is configured to generate the composite panoramic image from the first, second, and third camera feeds.

5. The work vehicle composite panoramic vision system of example 4, wherein the work vehicle includes a longitudinal axis, a left rear wheel position on a first side of the longitudinal axis, and a right rear wheel positioned on a second, opposing side of the longitudinal axis. The left rear vehicle camera is mounted to the work vehicle at a located closer to the left rear wheel of the work vehicle than to the longitudinal axis, as seen from a top-down view and taken along a lateral axis perpendicular to the longitudinal axis. Similarly, the right rear vehicle camera is mounted to the work vehicle at a location closer to the right rear wheel of the work vehicle than to the longitudinal axis, as further seen from the top-down view and taken along the lateral axis.

6. The work vehicle composite panoramic vision system of example 4, wherein the right rear vehicle camera and left rear vehicle camera are separated by a camera-to-camera spacing ranging from about 1 meter to about 5 meters.

7. The work vehicle composite panoramic vision system of example 1, wherein the work vehicle includes an engine bay housing aft of the operator station, while the first and second cameras are mounted to the work vehicle at locations adjacent opposing sides of the engine bay housing.

8. The work vehicle composite panoramic vision system of example 1, further including at least one obstacle detection sensor operably coupled to the controller and configured to monitor for obstacles in at least the first FOV and the second FOV. Additionally, the controller is further configured to: (i) when an obstacle is detected within the first FOV or the second FOV by the obstacle detection sensor, determine if the obstacle is within a predetermined distance of the work vehicle; and, (ii) if determining that the obstacle is within the predetermined distance, switch from presentation of the composite panoramic image on the display device to presentation of a single camera view in which the detected obstacle is visible.

9. The work vehicle composite panoramic vision system of example 8, wherein the predetermined distance substantially is equal to or grater than to a distance at which the first FOV overlaps with the second FOV, as taken along a longitudinal axis moving away from the work vehicle.

10. The work vehicle composite panoramic vision system of example 1, wherein the first FOV and the second FOV overlap in an FOV overlap region. The controller is configured to generate the composite panoramic image utilizing a two dimensional calibration plane, which transects the FOV overlap region and which is orthogonal to a longitudinal axis of the work vehicle.

11. The work vehicle composite panoramic vision system of example 10, further including at least one obstacle detection sensor operably coupled to the controller and configured to monitor for obstacles in at least the first FOV and the second FOV. The controller is configured to: (i) track a position of an obstacle detected within the first FOV or the second FOV by the obstacle detection sensor; and (ii) adjust a longitudinal spacing between the two dimensional calibration plane and the work vehicle based on the position of the detected obstacle.

12. The work vehicle composite panoramic vision system of example 11, wherein the controller is configured to adjust the longitudinal spacing between the two dimensional calibration plane and the work vehicle such that the two dimensional calibration plane intersects or is located immediately forward of the detected obstacle, as seen from a perspective of the work vehicle.

13. The work vehicle composite panoramic vision system of example 1, wherein the first and second vehicle cameras each comprise a stereoscopic camera configured to gather three dimensional image data of objects within the first and second FOVS. The controller utilizes the three dimensional image data when generating the composite panoramic image from at least the first and second camera feeds.

14. The work vehicle composite panoramic vision system of example 1, further including an operator interface coupled to the controller. The controller is further configured to: (i) generate first and second icons on the display device in conjunction with the composite panoramic image; (ii) switch from display of the composite panoramic image to display of the first camera feed on the display device when receiving operator input via the operator interface selecting the first icon; and (iii) switch from display of the composite panoramic image to display of the second camera feed on the display device receiving operator input via the operator interface selecting the second icon.

15. In further embodiments, the work vehicle composite panoramic vision system includes a display device utilized within the operator station of the work vehicle and a vehicle-mounted camera array. The vehicle-mounted camera array includes: (i) a right rear vehicle camera mounted to the work vehicle, having a first FOV, and positioned to capture a right rear vehicle camera feed of the work vehicle's exterior environment; (ii) a central rear vehicle camera mounted to the work vehicle, having a second FOV overlapping with the first FOV, and positioned to capture a central rear vehicle camera feed of the work vehicle's exterior environment; and (iii) a left rear vehicle camera mounted to the work vehicle, having a third FOV overlapping with the second FOV, and positioned to capture a left rear vehicle camera feed of the work vehicle's exterior environment. A controller is operably coupled to the display device, to the right rear vehicle camera, to the central rear vehicle camera, and to the left rear vehicle camera. The controller is configured to: generate a composite panoramic image of the work vehicle's exterior environment from the right, central, and left rear vehicle camera feeds. The controller further presents the composite panoramic image on the display device for viewing by an operator of the work vehicle.

CONCLUSION

The foregoing has thus disclosed embodiments of a work vehicle composite panoramic vision system. The above-described embodiments of the composite panoramic vision system generate a composite panoramic image from multiple camera feeds to provide an operator with a relatively expensive FOV of the work vehicle's exterior environment to enhance operator situational awareness, without requiring an operator to repeatedly switch between camera feeds. Additionally, embodiments of the composite panoramic vision system provide high fidelity images generated from multiple cameras feeds utilizing the 2D or 3D image consolidation approaches, as described above. Further, as a further benefit, embodiments of the composite panoramic vision system enable operators to rapidly and intuitively switch between display of the composite panoramic image and other single camera feeds, when so desired. In certain embodiments, the composite panoramic vision system further automatically switches from display of the composite panoramic vision system to display of a selected single camera feed based upon, for example, the location of detected obstacles in the vicinity of the work vehicle. The end result is a work vehicle composite panoramic vision system suitable for usage on a wide variety of work vehicle platforms that enhances operator situational awareness, while minimizing operator workload during work vehicle operation.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle composite panoramic vision system utilized onboard a work vehicle having an operator station, the work vehicle composite panoramic vision system comprising:
    a display device utilized within the operator station of the work vehicle;
    a vehicle-mounted camera array, comprising:
        a first vehicle camera mounted to the work vehicle, having a first field of view (FOV), and positioned to capture a first camera feed of the work vehicle's exterior environment from a first vantage point; and
        a second vehicle camera mounted to the work vehicle, having a second FOV partially overlapping with the first FOV, and positioned to capture a second camera feed of the work vehicle's exterior environment from a second vantage point; and
    a controller operably coupled to the display device, to the first vehicle camera, and to the second vehicle camera, the controller having processing architecture including a memory with instructions to:
        receive the first and second camera feeds from the first and second cameras, respectively;
        generate a composite panoramic image of the work vehicle's exterior environment from at least the first and second camera feeds; and
        present the composite panoramic image on the display device for viewing by an operator of the work vehicle;
    wherein the first FOV and the second FOV overlap in an FOV overlap region; and
    wherein the controller is configured to generate the composite panoramic image utilizing a two dimensional calibration plane, which transects the FOV overlap region and which is orthogonal to a fore-aft longitudinal axis of the work vehicle.

2. The work vehicle composite panoramic vision system of claim 1, wherein a line of sight (LOS) between the first vehicle camera and the second vehicle camera is blocked by an intervening structure of the work vehicle.

3. The work vehicle composite panoramic vision system of claim 2, wherein the intervening structure is visible in at least one of the first FOV and the second FOV; and
    wherein the controller is configured to visually remove the intervening structure from the composite panoramic image when generating the composite panoramic image from at least the first and second camera feeds.

4. The work vehicle composite panoramic vision system of claim 1, wherein the first vehicle camera and the second vehicle camera comprise a left rear vehicle camera and a central rear vehicle camera, respectively;
    wherein the vehicle-mounted camera array further comprises a right rear vehicle camera having a third FOV partially overlapping with the second FOV, and positioned to capture a third camera feed of the work vehicle's exterior environment from a third vantage point; and
    wherein the controller is further coupled to the right rear vehicle camera and is configured to generate the composite panoramic image from the first, second, and third camera feeds.

5. The work vehicle composite panoramic vision system of claim 4, wherein the work vehicle includes a left rear wheel position on a first side of the longitudinal axis and a right rear wheel positioned on a second, opposing side of the longitudinal axis;
    wherein the left rear vehicle camera is mounted to the work vehicle at the longitudinal axis; and
    wherein the right rear vehicle camera is mounted to the work vehicle at the second side of the longitudinal axis.

6. The work vehicle composite panoramic vision system of claim 4, wherein the right rear vehicle camera and left rear vehicle camera are separated by a camera-to-camera spacing ranging from about 1 meter to about 5 meters.

7. The work vehicle composite panoramic vision system of claim 1, wherein the work vehicle includes an engine bay housing aft of the operator station; and
    wherein the first and second cameras are mounted to the work vehicle at locations on opposing sides of the engine bay housing.

8. The work vehicle composite panoramic vision system of claim 1, further comprising at least one obstacle detection sensor operably coupled to the controller and configured to monitor for obstacles in at least the first FOV and the second FOV;
    wherein the controller is configured to:
        track a position of an obstacle detected within the first FOV or the second FOV by the obstacle detection sensor; and
        adjust a longitudinal spacing between the two dimensional calibration plane and the work vehicle based on the position of the detected obstacle.

9. The work vehicle composite panoramic vision system of claim 8, wherein the controller is configured to adjust the longitudinal spacing between the two dimensional calibration plane and the work vehicle such that the two dimensional calibration plane intersects or is located immediately forward of the detected obstacle, as seen from a perspective of the work vehicle.

10. The work vehicle composite panoramic vision system of claim 1, wherein the first and second vehicle cameras each comprise a stereoscopic camera configured to gather three dimensional image data of objects within the first and second FOVs; and
    wherein the controller utilizes the three dimensional image data when generating the composite panoramic image from at least the first and second camera feeds.

11. The work vehicle composite panoramic vision system of claim 1, further comprising an operator interface coupled to the controller;
    wherein the controller is further configured to:
        generate first and second icons on the display device in conjunction with the composite panoramic image;
        switch from display of the composite panoramic image to display of the first camera feed on the display device when receiving operator input via the operator interface selecting the first icon; and
        switch from display of the composite panoramic image to display of the second camera feed on the display device receiving operator input via the operator interface selecting the second icon.

12. A work vehicle composite panoramic vision system utilized onboard a work vehicle having an operator station, the work vehicle composite panoramic vision system comprising:
    a display device utilized within the operator station of the work vehicle;
    a vehicle-mounted camera array, comprising:
        a first vehicle camera mounted to the work vehicle, having a first field of view (FOV), and positioned to capture a first camera feed of the work vehicle's exterior environment from a first vantage point; and
        a second vehicle camera mounted to the work vehicle, having a second FOV partially overlapping with the first FOV, and positioned to capture a second camera feed of the work vehicle's exterior environment from a second vantage point;
    a controller operably coupled to the display device, to the first vehicle camera, and to the second vehicle camera, the controller configured to:
        receive the first and second camera feeds from the first and second cameras, respectively;
        generate a composite panoramic image of the work vehicle's exterior environment from at least the first and second camera feeds; and
        present the composite panoramic image on the display device for viewing by an operator of the work vehicle; and
    at least one obstacle detection sensor operably coupled to the controller and configured to monitor for obstacles in at least the first FOV and the second FOV;
    wherein the controller is further configured to:
        when an obstacle is detected within at least one of the first FOV and the second FOV by the obstacle detection sensor, determine if the obstacle is within a predetermined distance of the work vehicle; and
        if determining that the obstacle is within the predetermined distance, switch from presentation of the composite panoramic image on the display screen to presentation of a single camera view in which the detected obstacle is visible.

13. The work vehicle composite panoramic vision system of claim 12, wherein the predetermined distance is equal to or greater than to a distance at which the first FOV overlaps with the second FOV, as taken along a longitudinal axis of the work vehicle moving away from the work vehicle.

14. A work vehicle composite panoramic vision system utilized onboard a work vehicle having an operator station, the work vehicle composite panoramic vision system comprising:
    a display device utilized within the operator station of the work vehicle; and
    a vehicle-mounted camera array, comprising:
        a right rear vehicle camera mounted to the work vehicle, having a first field of view (FOV), and positioned to capture a right rear vehicle camera feed of the work vehicle's exterior environment;
        a central rear vehicle camera mounted to the work vehicle, having a second FOV overlapping with the first FOV, and positioned to capture a central rear vehicle camera feed of the work vehicle's exterior environment;
        a left rear vehicle camera mounted to the work vehicle, having a third FOV overlapping with the second FOV, and positioned to capture a left rear vehicle camera feed of the work vehicle's exterior environment;
        a controller operably coupled to the display device, to the right rear vehicle camera, to the central rear vehicle camera, and to the left rear vehicle camera, the controller having processing architecture including a memory with instructions to:
            generate a composite panoramic rear image of the work vehicle's exterior environment from imagery extracted from the right, central, and left rear vehicle camera feeds; and
            present the composite panoramic rear image on the display device for viewing by an operator of the work vehicle; and
    at least one obstacle detection sensor operably coupled to the controller and configured to monitor for obstacles aft of the work vehicle;
    wherein the controller is further configured to:
        when an obstacle is detected within one of the first, second, or third FOV by the obstacle detection sensor, determine if the obstacle is within a predetermined distance of the work vehicle; and
        if determining that the obstacle is within the predetermined distance, switch from presentation of the composite panoramic rear image on the display device to presentation of the right rear vehicle camera feed, the central rear vehicle camera feed, or the left rear vehicle camera feed in which the detected obstacle is visible.

15. The work vehicle composite panoramic vision system of claim 14, wherein a line of sight (LOS) between the right rear vehicle camera and the left rear vehicle camera is blocked by at least one intervening structure of the work vehicle.

16. The work vehicle composite panoramic vision system of claim 15, wherein the intervening structure of the work vehicle comprises an engine bay housing having a left sidewall and a right sidewall; and
    wherein the right rear vehicle camera is mounted at the right sidewall of the engine bay housing, while the left rear vehicle camera is mounted at the left sidewall of the engine bay housing.

17. The work vehicle composite panoramic vision system of claim 14, further comprising an operator interface located within the operator station; and wherein the controller is coupled to the operator interface and is configured to enable an operator to select which of the composite panoramic rear image, the right rear vehicle camera feed, the central camera feed, and the left rear vehicle camera feed is presented on the display device of the display device at a given moment in time.

18. The work vehicle composite panoramic vision system of claim 17, wherein the controller is further configured to:
generate a right rear camera icon, a central rear camera icon, and a left rear camera icon on the display device in conjunction with the composite panoramic rear image; and
switch from display of the composite panoramic rear image to display of the right rear vehicle camera feed, the central rear vehicle camera feed, or the left rear vehicle camera feed when receiving operator input via the operator interface selecting the left rear camera icon, the central rear camera icon, or the left rear camera icon, respectively.

* * * * *

UNITED STATES PATENT AND TRADEMARK OFFICE
CERTIFICATE OF CORRECTION

PATENT NO. : 10,882,468 B1
APPLICATION NO. : 16/667356
DATED : January 5, 2021
INVENTOR(S) : Czarnecki et al.

It is certified that error appears in the above-identified patent and that said Letters Patent is hereby corrected as shown below:

In the Claims

In Column 22, Claim 5, Line 39, delete "longitudinal" and insert -- first side of the longitudinal --, therefor.

Signed and Sealed this
Fourth Day of May, 2021

Drew Hirshfeld
*Performing the Functions and Duties of the
Under Secretary of Commerce for Intellectual Property and
Director of the United States Patent and Trademark Office*